FIG_4_

FIG_5_

INVENTOR
HAROLD T. AVERY
BY Clarence W. Martin
AGENT

INVENTOR
HAROLD T. AVERY
BY Clarence W. Martin
AGENT

May 1, 1962     H. T. AVERY     3,032,262
KNOB-SET DIVISION LINE-UP MECHANISM
Original Filed Oct. 22, 1956     10 Sheets-Sheet 8

FIG_11_

FIG_11A_

INVENTOR
HAROLD T. AVERY

May 1, 1962 H. T. AVERY 3,032,262
KNOB-SET DIVISION LINE-UP MECHANISM
Original Filed Oct. 22, 1956 10 Sheets-Sheet 9

FIG_12_

FIG_13_

FIG_13A_

FIG_14_

INVENTOR
HAROLD T. AVERY
BY Clarence W. Martin
AGENT

May 1, 1962 — H. T. AVERY — 3,032,262
KNOB-SET DIVISION LINE-UP MECHANISM
Original Filed Oct. 22, 1956 — 10 Sheets-Sheet 10

INVENTOR
HAROLD T. AVERY
BY Clarence W. Martin
AGENT

United States Patent Office 3,032,262
Patented May 1, 1962

3,032,262
KNOB-SET DIVISION LINE-UP MECHANISM
Harold T. Avery, Oakland, Calif., assignor to Smith-Corona Marchant, Inc., a corporation of New York
Original application Oct. 22, 1956, Ser. No. 617,454. Divided and this application Feb. 10, 1958, Ser. No. 714,193
4 Claims. (Cl. 235—63)

The invention relates to calculating machines and more particularly concerns means for controlling the line-up of dividend and divisor values prior to the initiation of a division operation. This application is a division of the patent application, Serial No. 617,454, filed October 22, 1956 by Eugene E. Reynolds, et al.

An object is to provide an improved division factor line-up mechanism.

Another object is to cause the shifting mechanism to shift the register carriage a constant predetermined number of orders from any one of a plurality of selected starting positions.

In order that the invention may be practiced by others, it will be described in terms of an express embodiment, given by way of example only, and with reference to the accompanying drawings in which.

The U.S. Patent No. 2,710,141, issued on June 7, 1955, to Harold T. Avery, discloses a division line-up mechanism whereby the carriage is shifted a predetermined number of orders toward the right to align the highest order of the dividend with the highest order of the divisor, before initiating a division operation. In that patent, the number of orders of shift was determined by the "spread" in the number of orders between any two of a plurality of ordinally arranged tabulator buttons. According to that patent, two tabulator buttons are depressed for each new setting, care being taken to insure that the same desired spread is provided in depressing the two buttons. According to the present invention, the carriage is automatically returned, at the termination of a division operation, to a selected one of a plurality of ordinal positions under the control of a plurality of decimal keys, and the machine can be selectively adjusted for any predetermined spread regardless of the ordinal position to which the carriage is return shifted. This is made possible by improved mechanisms including a line-up knob 3670 (FIGS. 1 and 11) which may be rotated to any one of six positions to indicate by the digits zero, and one to five inclusively, the number of orders of carriage shift that will occur. With the knob set in a selected position, the simultaneous depression of the line-up key 2000 (FIG. 1) and the divide key 970 will automatically initiate a rightward shift of the carriage, for a number of orders selected by the knob.

VALUE ENTRY MECHANISM

The value entry mechanism comprises a plurality of rows of keys in a keyboard, each row, in turn, controlling an ordinal selection mechanism. Depression of a key sets a mechanical representation of the value selected into the corresponding order of the selection mechanism. The value entry mechanism controlled by the key includes keystem 103 (FIG. 2), selection bar 120, lever 137 and gear 151. Gear 151 and an integral cam unit 146 controls mechanism which adjusts a gear train including gears 189 and 271 in accordance with the value selected, as is described in the last mentioned patent.

NUMERAL WHEEL ACTUATION

The actuating mechanism for the numeral wheels 279 (FIG. 1) of the product register comprises in each order, a gear 189 (FIG. 2) which is driven an amount proportional to the value selected in that order. Gear 189 underlies the gear 271 which is in mesh with a respective numeral wheel. Normally, gear 271 stands in the position shown in FIG. 2; however, during all calculating operations the register carriage is "dipped" during the setting cycle as disclosed in U.S. Patent No. 2,271,240, into a position where gear 271 meshes with gear 189. The latter then drives the numeral wheel a selected amount in a plus or minus direction, as the case may be.

Figure 2:
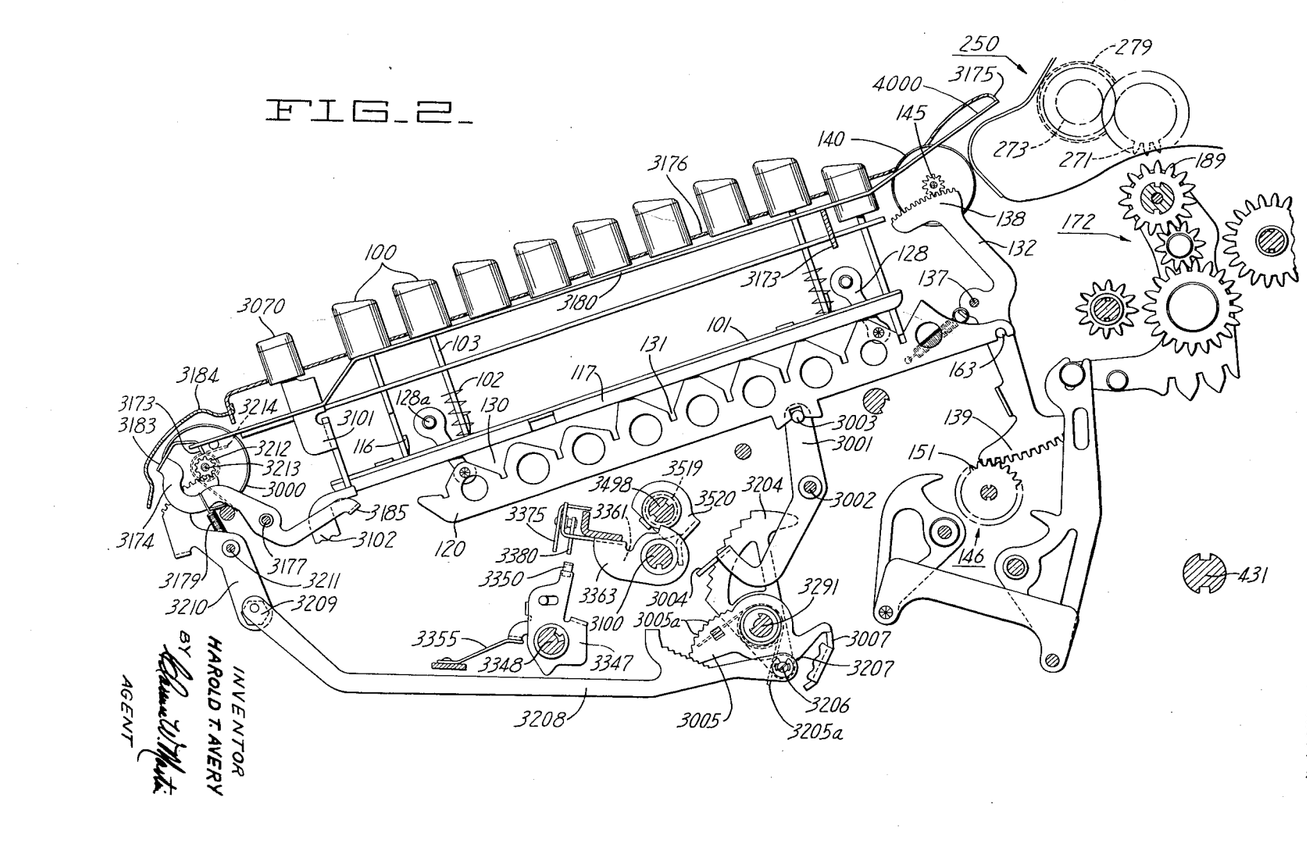
FIG. 2 is a right side view in section showing a portion of the keyboard, the value entry mechanism, the numeral wheel actuators, the decimal storage mechanism, the register, and the factor storing mechanism.

Gear 189 is driven by means of a proportional gear drive generally indicated at 172. At the end of each ordinal actuation the carriage is retured to the position shown, the disengagement of gears 271 and 189 permitting the carriage to be shifted without interference, if such shift should be desired.

CLUTCH OPERATION

The drive train from the motor to the various clutches is substantially identical as that disclosed in the previously mentioned Patent No. 2,271,240; however, in the present machine the functions of the setting and restore clutches are combined in the setting clutch, and the space formerly required for the restore clutch is utilized for a new clutch, referred to hereinafter as a master clutch. Whereas the setting clutch serves to perform various functions preliminary to, and also following, the operation of the main (numeral wheel actuator) clutch, the master clutch serves to perform preliminary functions prior to other operations. The specific operations of these clutches are described hereinafter in more detail. The motor drive train is adequately disclosed in the last mentioned patent.

All of the clutches are of the pawl and ratchet type such as the clutch 10 shown in U.S. Patent No. 2,162,238. All clutches operate through 360° to complete a cycle of operation, with one exception. The setting clutch may be disengaged at 180° or at 360° of operation. During the first 180° of operation the setting clutch performs its setting, or programming, functions, and during the second 180° it performs various restore functions. When any machine function is initiated which includes actuation of the numeral wheels the setting clutch is engaged for 180° to "dip" the accumulator register into engagement with the actuators. During the latter part of this cycle the setting clutch causes engagement of the main clutch which causes actuation of the numeral wheels. Termination of operation of the main clutch initiates a second 180° of operation of the setting clutch during which it raises the carriage and performs other "restore" functions previously attributed to the restore clutch in the Patent No. 2,271,240.

Figure 1:
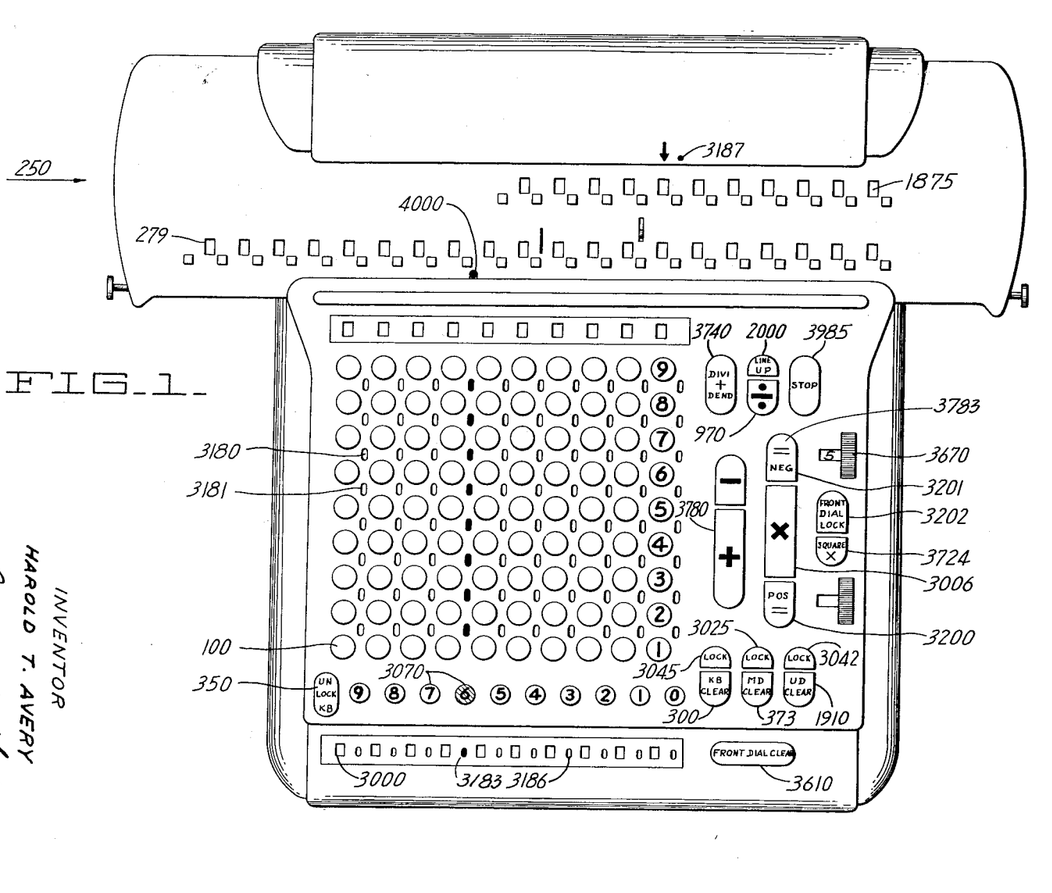
FIG. 1 is a plan view of a calculating machine embodying the invention.

The setting clutch is also used to initiate all operations of the shift clutch, such initiation occurring during the restore cycle. Shift operations occur both during automatic calculations involving the usual ordinal shifts, or in response to depressions of decimal keys 3070 (FIG. 1). In the latter case the decimal keys initiate a continuous 360° operation of the setting clutch without an intervening main clutch operation, and during the last 180°, or restore cycle, the setting clutch engages the shift clutch which tabulates the carriage to a predetermined position as described hereinafter.

Figure 3:
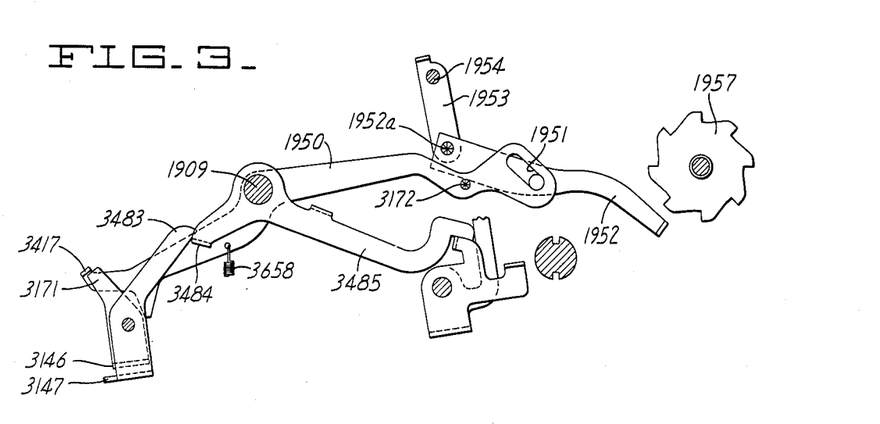
FIGS. 3, 3A, and 3B are right side views of the setting clutch engaging mechanism.
Figures 3A, 3B:
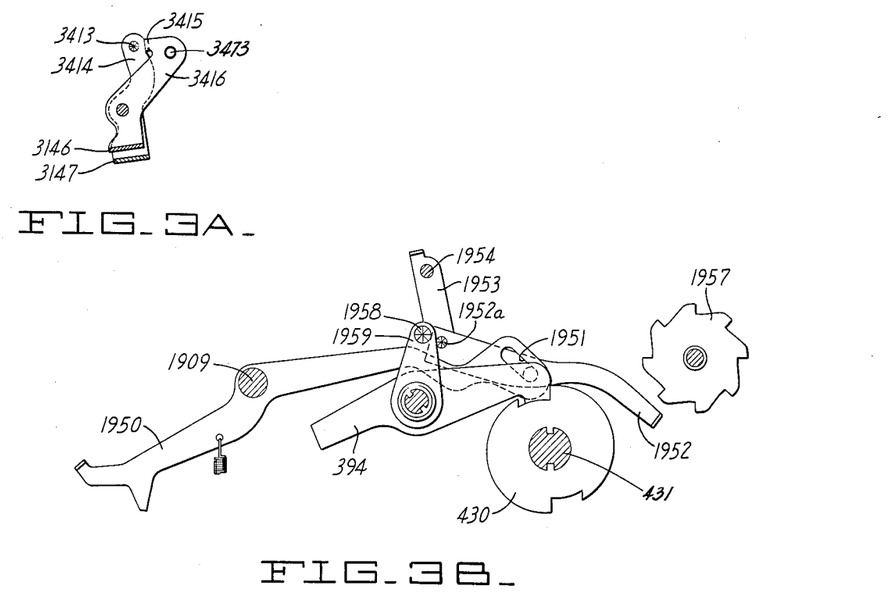

In prior machines the setting clutch has been engaged by manual operation of the plus, minus, and divide keys whereas the multiplying keys initiated a setting clutch operation through the intermediary of a power driven device such as the pawl and ratchet arrangement referred to at 1952 and 1957 in FIG. 62 of U.S. Patent No. 2,271,240, and in FIGS. 3 and 3B of the present disclosure. In the machine of the subject invention, however, the arrangement is such that this power driven device is employed upon depression of any key which initiates the operation of the setting clutch.

Referring to FIG. 3, a ratchet 1957 is driven by a gear train connected to the motor. Cooperating with the ratchet is a link 1952 which is pivotally mounted at 1952a to a link 1953 supported for rocking movement at 1954. Link 1952 has pin and slot connection 1951 with a lever 1950, and is normally held in the position shown due to this pin and slot connection 1951. The leftmost end of link 1952 (FIG. 3B) lies adjacent a stud 1958 fixed to an arm 1959 which is integral with the setting clutch control dog 394. Lever 1950 is freely mounted within the machine framework at 1909 and is spring urged counterclockwise by spring 3658 (FIG. 3), but is held in the position shown by a latch lever 3171. Upon depression of various operating keys, described hereinafter, the latch lever 3171 and an attached bail 3146 are rocked clockwise, thus releasing lever 1950 for counterclockwise movement. The latter acts through pin and slot connection 1951 to lift the link 1952 into engagement with ratchet 1957 whereupon the link 1952 is moved toward the left by one of the respective rotating ratchet teeth with which it engages. This rocks the arm 1959 and the clutch dog 394 counterclockwise to initiate the operation of the setting clutch 430. Repeated engagement of link 1952 with ratchet 1957 is prevented in a manner similar to that described in the Patent No. 2,271,240; namely, the setting clutch dips the carriage and a mechanism responsive to such dipping movement contacts a pin 3172 (FIG. 3) on lever 1950 and returns the latter to the initial disabled position shown where it is locked by the latch lever 3171.

A mechanism is provided which is normally operable during the setting cycle of the setting clutch to cause engagement of the main clutch, but which mechanism is disabled when it is desired to eliminate the operation of the main clutch and, instead, to cause two successive setting clutch cycles of operation (setting and restore cycles). In the latter case the two successive cycles of operation are referred to hereinafter as a "blank cycle" and is used to cause engagement of the shift clutch.

Figure 4:
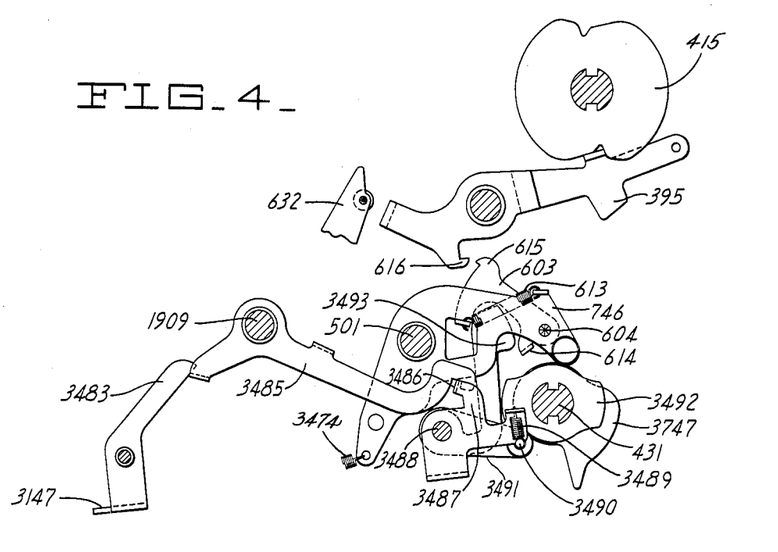
FIGS. 4 and 5 are right side views of the main clutch and associated mechanisms.

As above described, each time the bail 3146 (FIG. 3) is rocked clockwise, the lever 1950 rocks counterclockwise to lift lever 1952 into engagement with ratchet 1957 (FIG. 3B) and thus cause engagement of the setting clutch by rocking the clutch dog 394 in a counterclockwise direction. The clutch dog 394 is then released to permit the dog to re-engage the periphery of the clutch and disengage the same after 180° of operation. The setting clutch drives the shaft 431 and a line of cams including the cam 3747 (FIG. 4) in a counterclockwise direction. During the first 180° (setting cycle) the cam reciprocates a follower 746, first rocking it in a counterclockwise direction about shaft 501 and then releasing it to the urgency of a spring 3474 which rocks the follower clockwise to its initial position.

Figure 5:
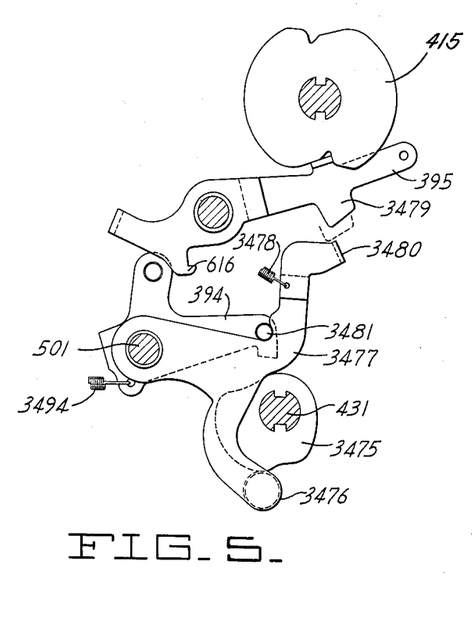

A live tip 603 is pivotally mounted at 604 on the follower and has a hook 615 which, during counterclockwise movement of the follower 746, engages a hook 616 on the main clutch dog 395 and rocks the latter clockwise to cause engagement of the main clutch 415. At the end of the current setting cycle, the setting clutch is disengaged. Meanwhile, the setting cam 3475 (FIG. 5) is also rotated during the setting cycle and after 180° of rotation thereof the low periphery of the cam underlies the roller 3476 on a follower 3477. At such time the follower tends to rock counterclockwise about its pivot in response to spring 3478; however, since the main clutch is engaged at this time, the extension 3479 on the clutch dog stands in the dotted line position where it overlies ear 3480 on follower 3477 and prevents the latter from rocking counterclockwise. When the main clutch dog 395 returns to the full line position shown to disengage the main clutch 430, the follower 3477 is permitted to rock counterclockwise. A pin 3481 on the setting clutch dog 394 overlies a portion of follower 3477 and is therefore rocked counterclockwise with the follower to initiate the second, or restore cycle of the setting clutch. During this restore cycle, the cam 3475 (FIG. 5) is returned to the initial position shown and rocks the follower clockwise, thus releasing the setting clutch dog 394 for re-engagement with the setting clutch. In this manner the setting clutch is disengaged at the end of the restore cycle.

In certain operations described hereinafter, it is desirable to operate the setting clutch through 360° of blank operation, i.e., consecutive cycles of setting and restore functions without an intervening main clutch operation. For this purpose there is provided a bail 3147 (FIGS. 3 and 3A) which underlies the bail 3146. One arm 3414 of bail 3147 carries a pin 3413 which lies adjacent an ear 3415 on the arm 3416 of bail 3146. Thus, if bail 3147 is rocked clockwise, as described hereinafter, a pin 3413 contacts ear 3415 and also rocks bail 3146 in a clockwise direction to initiate a setting cycle as described above; however, at the same time, another arm 3483 of bail 3147 rocks clockwise and through contact with ear 3484, rocks a lever 3485 counterclockwise about pivot 1909. The rightmost end of lever 3485 (FIG. 4) is formed as a hook and normally overlies an ear 3486 on a lever 3487 pivoted at 3488. Lever 3487 has spring connection 3489 with a pin 3490 carried by a cam follower 3491 which has a roller pivoted on pin 3490 adapted to cooperate with a cam 3492. The cam 3492 rocks the follower clockwise thus stressing the spring 3489 and tending to cause lever 3487 to follow the cam follower. In the position of the parts shown, the hook on the end of lever 3485 normally prevents lever 3487 from partaking of such movement and spring 3489 is therefore idly stressed; however, when bail 3147 is rocked counterclockwise and the hook on the end of lever 3485 is rocked away from the ear 3486, lever 3487 is free to follow the cam follower 3491 and is rocked in a clockwise direction. At such time a hook 3493, integral with lever 3487, rocks clockwise into the path of ear 614 on the live-tip 603. Thus when follower 746 rocks counterclockwise, the live-tip is restrained from engaging the hook 616 on the main clutch dog 395 and a main clutch operation is not initiated. Since the main clutch is not engaged the extension 3479 (FIG. 5) remains in its full line position and the follower 3477 is free to rock counterclockwise during the setting cycle and hold the setting clutch dog 394 on clutch engaging position for a second, or restore cycle. During the latter cycle, the cam 3475 returns the follower 3477 to its initial position thus permitting the spring 3494 to rock the clutch dog 394 to clutch disengaging position. In this manner a continuous 360° operation of the setting clutch is obtained.

From the foregoing description it will be seen that when bail 3146 is rocked clockwise, the setting clutch rotates 180° and then initiates the operation of the main clutch which is followed by 180° of operation of the setting clutch; whereas, if bail 3147 is rocked clockwise, it initiates a continuous 360° blank cycle operation of the setting clutch without an intervening operation of the main clutch.

For purposes of the present disclosure the previous discussion of the various clutches is sufficient reference being had to the Patent No. 2,271,240, for a more detailed description of all clutches. The shift clutch and associated mechanisms are described in more detail hereinafter.

CARRIAGE SHIFTING MECHANISM

The carriage 250 (FIG. 1) contains the product and counter registers, also referred to herein as the middle and upper dials, respectively, and which carriage is shifted to the left and right either manually, under the control of the decimal keys 3070, or automatically, under the control of various calculating mechanisms. The shift mechanism includes a cyclically operable clutch driven by the motor, and a drive transmission train from the clutch to a rack and pinion drive for the carriage.

Figures 6, 7:
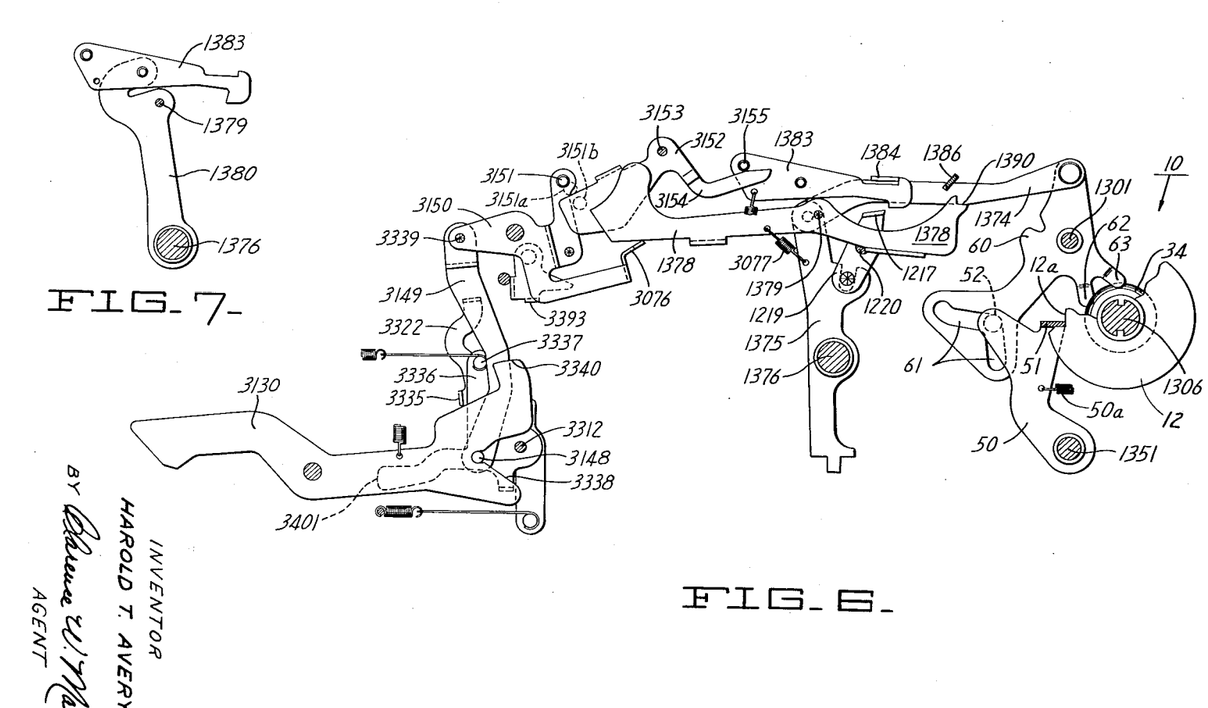
FIG. 6 is a right side sectional view of the shift clutch and associated control mechanisms.
FIG. 7 is a right side view of a portion of the shift control mechanism.

The shift clutch is generally indicated at 10 in FIG. 6 and is identical to a similarly numbered clutch shown in the Patent No. 2,162,238, issued June 13, 1939. A clutch control dog 50 is pivoted at 1351 and is urged by spring 50a into a notch 12a in disc 12 where an ear 51 on dog 50 acts through a familiar pawl and ratchet arrangement (not shown) to hold the clutch in disengaged position.

The following described control mechanism for moving the clutch control dog 50 to clutch engaging position is the same as that shown in the previously mentioned Patent Nos. 2,162,238 and 2,271,240. Corresponding parts carry corresponding numbers of a value less than 3000. All parts bearing reference numbers over 3000 are new in the present disclosure.

The clutch control dog 50 carries a pin 52 which, due to the urgency of spring 50a on the dog 50, normally lies in the bottom of an inverted V shaped slot 61 cut in a lever 60. This centralizes lever 60 in the position shown in which a pair of lugs 62, 63 on the lever, in turn, serve to centralize a shift drive reversing unit 34. According to the two last mentioned patents the lever 60 is rocked in a clockwise direction to cause a rightward shift of the carriage and is rocked counterclockwise to initiate a left shift. Upon either clockwise or counterclockwise movement of lever 60, a corresponding side of slot 61 exerts a camming action on pin 52 and rocks the control dog to clutch engaging position. Simultaneously the lugs 62, 63 shift the reverse unit control member 34 either in one direction or the other, axially of shaft 1306 to adjust for a right or left shift as the case may be. Conversely, when the above-mentioned lever 60 and dog 50 are released to the urgency of spring 50a the clutch control dog is removed to clutch disengaging position and the reverse unit is returned to the central nonshift position shown.

Lever 60 is rocked clockwise or counterclockwise for right and left shift, respectively, as follows. During each setting cycle described in Patent No. 2,271,240, a shift initiating ear 1386 is moved toward the right over a notch 1390 in a lever 1378. Then, during the restore cycle, the ear 1386 is returned to the position shown. In the present instance, this would be an idle operation since lever 1378 is held in a clockwise position due to the influence of a shelf 3076 described hereinafter, which underlies the leftmost end of lever 1378. Thus, in the current position of lever 1378, a shifting operation is prevented; however, under circumstances later described, the shelf 3076 is moved downwardly which permits spring 3077 to rock lever 1378 counterclockwise so that during the reciprocation of ear 1386 the ear engages the notch 1390 and moves lever 1378 toward the left. Lever 1378 is pivotally mounted at 1379 to an arm 1380 (FIG. 7) which is freely mounted on a shaft 1376. A shift direction interponent 1383 is freely mounted near the upper end of arm 1380 and is spring urged in a counterclockwise direction so that a hook on the upper rightmost end of the interponent engages an ear 1384 on link 1374. The link is connected to the upper end of lever 60, and the arrangement is such that when lever 1378 is moved toward the left, it acts through pivot 1379, arm 1380 and the shift interponent 1383 to pull link 1374 toward the left. This rocks lever 60 in a counterclockwise direction and initiates a leftward shift.

Under certain conditions noted hereinafter, the shift interponent 1383 will be standing in a clockwise position with the lower hook in engagement with an ear 1217 on a lever 1219 pivoted at 1220. In this case, the leftward movement of interponent 1383 rocks lever 1219 counterclockwise and through pin and slot connection with lever 1375 rocks the latter clockwise about its pivot 1376. Lever 1375 has pivotal connection with the leftmost end of link 1374 and acts through the link to rock lever 60 in a clockwise, or right shift initiating direction.

From the foregoing description it will be observed that the setting clutch acts through ear 1386 to selectively initiate a shift clutch operation depending upon whether lever 1378 is standing in the nonshift position shown or in a counterclockwise shift initiating position, and that the direction of shift is determined by whether the shift interponent 1383 is engaged with ear 1384 or 1217. The duration of shift operations is determined in a manner described hereinafter.

DECIMAL SHIFT CONTROL MECHANISM

The decimal shift control mechanism includes ten decimal storage keys 3070 (FIG. 1) which are numbered from "0" to "9," located between the respective rows of keys 100. Depression of a key 3070 moves three respective decimal indicators 3180, 4000, and 3183 to positions of display relative to the keyboard 100, the middle dials 279 and the factor indicator 3000, and also shifts the carriage 250 to a position in which the middle dial decimal indicator 4000 correctly points off the decimal location for these middle dials. The decimal indicating function of the decimal keys is more fully described in said parent application, and reference is now made to the carriage shift control mechanism which is operated by the decimal keys.

Figure 12:
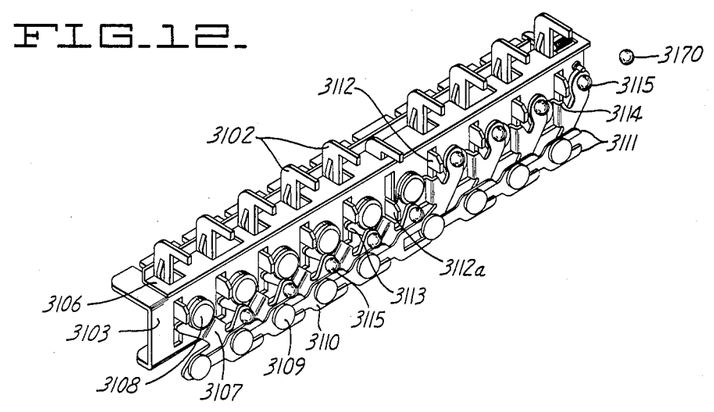
FIG. 12 is a projection of the decimal-shift initiating mechanism seen from the right rear of the machine.
Figure 13:
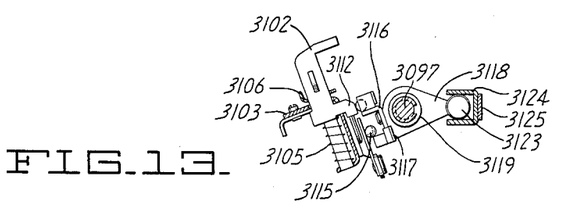
FIGS. 13 and 14 are right side sectional views of a portion of the decimal-shift control mechanism.
Figure 14:
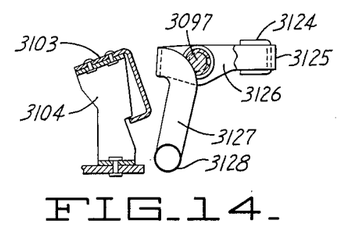

Each key 3070 (FIG. 2) has a keystem 3101 which is mounted in conventional manner for up and down sliding movement within the framework of the machine. The lower end of each keystem overlies a sub-keystem 3102 (FIGS. 12 and 13) which is mounted for up and down sliding movement within a sub-frame 3103. The latter is fixed at its opposite ends to similar brackets 3104 (FIG. 14) which are fixed to the main framework of the machine. Each sub-key 3102 is urged to its raised position by a spring 3105 (FIG. 13).

Upon depression of a decimal key 3070, its corresponding sub-key 3102 is depressed and locked in depressed position by a lock bar 3106 of conventional construction. The depression of the key operates a mechanism described below to: (1) establish a mechanical representation of the position to which the carriage is to be shifted; (2) determine the direction of shift in accordance with the current position of the carriage and the position to which it is to be shifted; and (3) initiate the operation of the shift clutch.

Figure 13A:
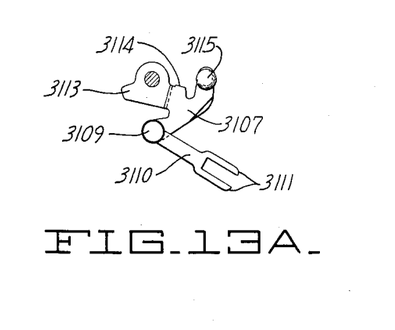
FIG. 13A is a detailed drawing of an ordinal shift control member.

Ten bellcranks 3107 (FIGS. 12 and 13A) are pivotally mounted as at 3108 to the sub-frame 3103, and pivotally mounted at 3109 on each bellcrank is a link 3110 having a forked end 3111 which embraces the pivot 3109 of its adjacent link 3110. It will therefore be apparent that if any bellcrank is rocked in a counterclockwise direction it will act through its link 3110 to push its adjacent bellcrank 3107 (to the right as seen in FIG. 12) in a counterclockwise direction. Conversely if any bellcrank is rocked in a clockwise direction it will push on the link of the adjacent leftward bellcrank and rock it in a clockwise direction.

It will also be apparent that the elongated slot in the fork 3111 of each link permits a respective link to rock clockwise without imparting motion to the bellcranks to the right thereof, and permits a bellcrank to rock in a counterclockwise direction without imparting motion to the links and bellcranks to the left. Thus two adjacent bellcranks may be rocked in opposite directions and due to the above-described linkages the bellcrank that is rocked clockwise rocks all of the bellcranks to the left thereof in a clockwise direction while the bellcrank that is rocked in a counterclockwise direction will rock all of the bellcranks to the right thereof in a counterclockwise direction.

Advantage of this action is taken in the present machine by providing each sub-key 3102 with an extension 3112 which overlies a shoulder 3113 on the left side of one bellcrank 3107 and which also overlies a shoulder 3114 on the right side of an adjacent bellcrank 3107. Thus, if any sub-key is depressed, as is the case in FIG. 12 where the "5" key is depressed, then the bellcranks on opposite sides thereof will be rocked in opposite directions, and this establishes a two way mechanical representation of the location of the key depressed. Such manifestation is used to initiate a shift operation in the appropriate direction and to terminate shifting when the carriage reaches the selected position.

For this purpose each bellcrank 3107 carries a ball 3115 which rocks with the bellcrank and stands either in a raised or lowered position depending on whether its respective bellcrank stands rocked in a counterclockwise or clockwise position.

Cooperating with balls 3115 is a shift control member 3116 (FIG. 13) which is fixed to a transversely bent ear 3117 on a lever 3118. The latter is fixed to a worm nut 3119 which is mounted on a worm shaft 3097 (FIG. 13). The latter is rotated in timed relationship with the shifting of the register carriage, and the arrangement is such that the control member 3116 is shifted one order relative to the balls 3115 for each ordinal shift of the carriage 250.

Figure 15:
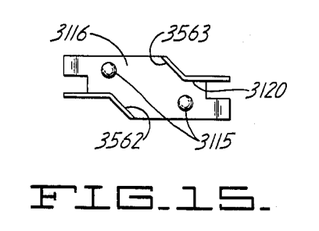
FIGS. 15, 15A, 16 and 16A are front views of a portion of a shift control member.
Figure 15A:
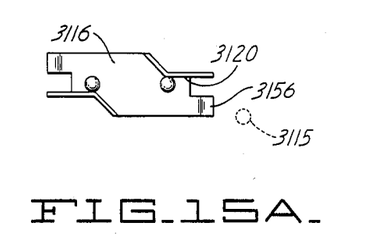

The shift control member 3116 normally stands in a position of alignment with the depressed decimal key. Also, as shown in FIG. 15, the member 3116 normally is centrally located with respect to the balls 3115, one of which is in raised position and the other of which is in its lower position. Thus, with the No. 5 decimal key in depressed position, the control member 3116 is in the No. 5 position. Now assume that the No. 4 decimal key is depressed to initiate a shift of the carriage to its No. 4 position. In this case the carriage will be shifted one order to the left; however, the decimal-shift control mechanism is arranged in inverse order with respect to the carriage shift positions, and therefore, the control member will be shifted one order to the right to the No. 4 decimal position. Depression of the No. 4 decimal key moves the ball 3115 which is currently in its lower position (FIG. 15) to the raised position shown in FIG. 15A, thus contacting surface 3120 on the control member and moving it upwardly to the position shown in FIG. 15A. This corresponds to clockwise movement of member 3116 as seen in FIG. 13 which, in turn, moves lever 3118 clockwise to initiate a shift operation as follows.

Lever 3118 carries a knob 3123 which is embraced by a channel bar 3124 extending transversely of the machine and fixed at opposite ends to ears 3125 (FIG. 14) carried by levers such as 3126. Levers 3126 are freely mounted on shaft 3097 and the right side lever 3126 is formed as a bail with a depending arm 3127. A roller 3128 is carried on the bottom end of the arm, and the arrangement is such that when the shift control member 3118 (FIG. 13) is rocked in a clockwise or counterclockwise direction, the roller 3128 (FIG. 14) will partake of a similar movement.

Figure 8:
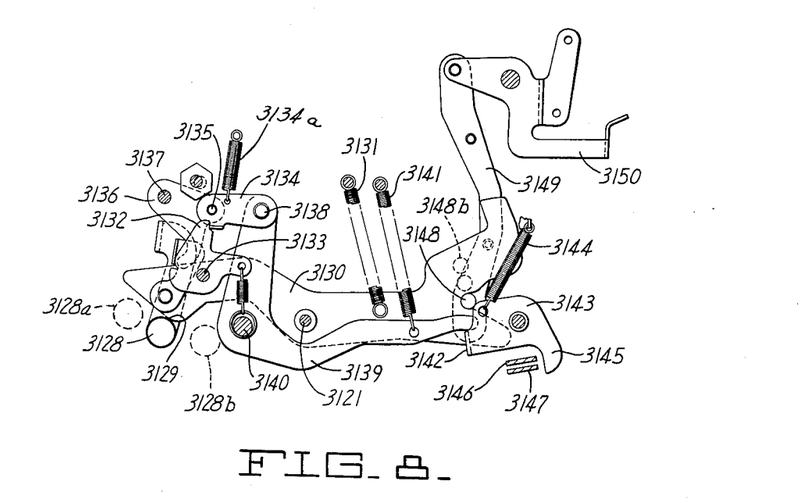
FIG. 8 is a right side view of part of the shift control mechanism.

Roller 3128 normally stands in the full line position shown in FIG. 8, where it underlies the leftmost end 3129 of a lever 3130. The latter is pivoted at 3121 and urged counterclockwise by a spring 3131 against roller 3128. When roller 3128 is moved clockwise, as described above, it is moved to the dotted line position 3128a and permits spring 3131 to rock lever 3130 counterclockwise to the extent permitted by contact of the lever with the roller in its new position. At such time a latch lever 3132, mounted at 3133 on lever 3130, is moved out of restraining engagement with an ear on toggle link 3134. The latter is pivotally mounted at 3135 to a link 3136 which is freely mounted on a fixed pivot 3137. The opposite end of toggle link 3134 is pivoted at 3138 to a bellcrank 3139. The latter is freely mounted at 3140 and urged counterclockwise by a spring 3141. The toggle link 3134 is urged to the position shown by a spring 3134a, but the latter spring is weaker than spring 3141 and therefore when the toggle is broken, bellcrank 3139 is rocked counterclockwise by spring 3141.

The rightmost end of bellcrank 3139 overlies an ear 3142 of a shift initiating lever 3143 which is urged clockwise by spring 3144 and an extension 3145 on lever 3143 lies adjacent the bails 3146 and 3147. Thus, when bellcrank 3139 rocks counterclockwise, spring 3144 rocks lever 3143 clockwise and extension 3145 moves bails 3146 and 3147 toward the left. Bail 3146 (see also FIG. 3) is part of a mechanism, described hereinbefore for initiating the operation of the setting clutch, and bail 3147 is a portion of the mechanism for preventing the initiation of the operation of the main (actuating) clutch. Thus, the setting clutch is engaged for a blank cycle, i.e., it does not initiate an actuating operation, and as previously described, the ear 1386 (FIG. 6) is reciprocated by the setting clutch. As will be seen immediately below, this initiates the operation of the shift clutch 10.

It will be recalled that lever 3130 (FIGS. 6 and 8) was rocked in a counterclockwise direction. At such time a stud 3148, fixed on the lower end of a link 3149 and spring urged into a V shaped slot in lever 3130, is moved upwardly, thus moving link 3149 upwardly. The upper end of the link is pivotally connected to a shift enabling and disabling member 3150. The latter is therefore rocked clockwise, moving extension 3076 (FIG. 6) downwardly and permitting the lever 1378 to rock counterclockwise into position where the notch 1390 in the rightmost end thereof will be engaged by ear 1386 during the setting clutch operation. In this manner a shift clutch operation is initiated.

The direction of the shift is controlled by the shift interponent 1383 which normally stands in the position shown in engagement with the left shift ear 1384. A stud 3151 on member 3150 is rocked to the dotted line position 3151a during the previously described rocking of member 3150, in which position the stud merely overlies the tip edge of a lever 3152 and does not move the latter. Lever 3152 is pivotally mounted at 3153 to the framework of the machine and has an extension 3154 which underlies a stud 3155 on shift interponent 1383. It will be observed that if lever member is rocked to the extent that stud 3151 moves to the dotted line position 3151b, which is the case when a right shift is to be initiated, as explained hereinafter, then the lever 3152 will be rocked counterclockwise. At such time the extension 3154 will rock the shift direction interponent 1383 in a clockwise direction where the hook on the right end thereof engages the right shift ear 1217 and conditions for a right shift as previously explained.

A single order left shift is all that is necessary to shift the carriage 250 (FIG. 1) from its No. 5 to its No. 4 position and the duration of the shift is determined as follows. A shift latch lever 3160 (FIG. 17) is pivoted at 3161 and urged counterclockwise by a spring 3162; however, the previously mentioned stud 3148 on link 3149 overlies lever 3160 and normally holds it in the position shown where a stud 3163 on the right end of the latch lever is held spaced apart from the lower end of lever 1375. When lever 3130 is rocked counterclockwise, as previously described, the stud 3148 is moved upwardly thus permitting the latch lever to rock upwardly to the extent that stud 3163 contacts surface 3164 on lever 1375. This relationship is maintained until lever 1375 is rocked either clockwise or counterclockwise during initiation of the shift. In the present example, the lever is rocked counterclockwise to initiate a left shift of the carriage and then stud 3163 drops into notch 3165 to maintain the shift clutch engaged for the requisite number of cycles; however, in the present instance a single order shift is all that is required and therefore the shift latch lever is almost immediately returned to its initial position so that the shift clutch is disengaged at the end of the current cycle, as follows.

When the carriage 250 is shifted to the left, the control member 3116 (FIG. 15A) is shifted to the right and during such shift, a rightmost camming surface 3156 engages the ball of the next lower order, shown in the dotted lines, which ball is standing in its lowermost position. This rocks the member 3116 counterclockwise to the initial position shown in FIGS. 13 and 15 at which time the roller 3128 (FIG. 8) is rocked counterclockwise and returned to the full line position shown. This, in turn, rocks lever 3130 clockwise and stud 3148 downward, the latter moving the latch lever 3160 (FIG. 17) clockwise to its initial position. This releases the shift lever 1375, and therefore the shift clutch dog 50 is permitted to rock clockwise and disengage the clutch at the end of the current cycle. Meanwhile, the lowering of stud 3148 and link 3149 rocks lever 3150 back to its initial position where the extension 3076 (FIG. 6) rocks the lever 1378 to non-shift position. This completes the shift operation and the No. 4 decimal key remains depressed until another decimal key is depressed.

It will be observed that if the No. 3 decimal key or the No. 2 decimal key, etc., had been depressed, the balls 3115 (FIG. 15A) are moved to such positions where the cam surface 3156 on the shift member 3116 does not contact a ball in its lowermost position until the requisite number of ordinal shifts have been completed.

Figure 9:
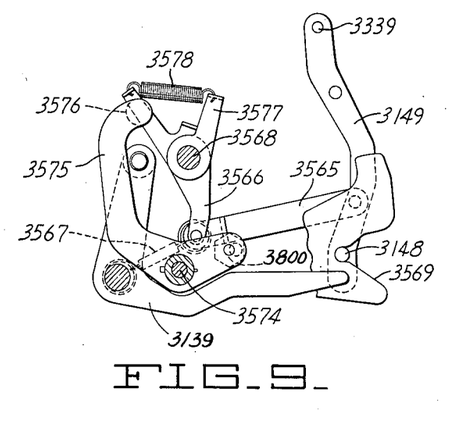
FIG. 9 is a right side view of a booster mechanism for initiating a return shift upon completion of multiplication operations.

It will be recalled that the toggle 3134—3136 (FIG. 8) is broken to initiate the "blank" setting clutch operation which, in turn, initiates the shift operation. The toggle is then restored in order to limit the setting clutch to a single blank operation. During the restore cycle of the setting clutch, a lever 3575 (FIG. 9) is rocked clockwise, as described under the heading, "Return Shift to Home Position," at which time an eccentric stud 3800 contacts lever 3139 (FIG. 8) and rocks the latter clockwise to its initial position, thus restoring the toggle 3134—3136 and at the same time rocking the setting clutch blank initiating lever 3143 back to its initial position shown.

Figure 16:
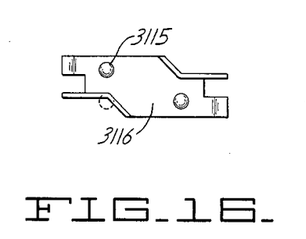
Figure 16A:
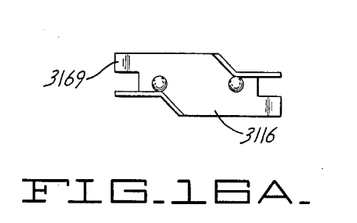

The above description has been concerned with the initiation of a leftward tabulation of the carriage 250 (FIG. 1). Referring now to a rightward tabulation such as that required to move the carriage from the No. 6 position to the No. 10 position, for example, the operator depresses the No. 10 decimal key 3070. This results in rocking all of the bellcranks 3107 (FIG. 12) in a clockwise or downward direction. As the balls 3114 of all higher orders move downward, the ball 3115 (FIG. 16) moves from the full line to the dotted line position and moves the shift control member 3116 downward to the position shown in FIG. 16A (or counterclockwise as viewed in FIG. 13). This movement acts through knob 3123 (FIG. 13) to rock the roller 3128 (FIG. 8) in a counterclockwise direction to the dotted line position 3128b, and thus permits lever 3130 to rock counterclockwise two increments. This moves the stud 3148 to the dotted line position 3148b, and through link 3149 rocks lever 3150 (FIG. 6) clockwise to the extent that stud 3151 thereon is moved to the dotted line position 3151b. The latter rocks lever 3152 counterclockwise and, through extension 3154, rocks the shift direction interponent 1383 to its right shift position where the hooked end overlies ear 1217.

Meanwhile the counterclockwise movement of lever 3139 (FIG. 8) initiates a blank setting clutch operation which, as previously described, initiates a shift operation. In the present case the carriage is shifted to the right until the control member 3116 approaches its leftmost position. As such time the upper camming surface 3169 (FIG. 16A) contacts a ball 3170 (FIG. 12) fixed in the machine framework in the upper position shown and the control member is rocked to its initial position to terminate the shift.

RETURN SHIFT TO HOME POSITION

In a conventional calculating machine the multiplicand and multiplier value are entered around a fixed decimal in the keyboard. Prior to the commencement of multiplication the carriage is shifted a number of orders which is one less than the number of whole digits in the multiplier factor. It will be apparent that if the carriage is return shifted to the beginning position following the calculation, the decimal point will be correctly pointed off in the product value. This return shift is automatically accomplished in the invention disclosed herein by means of lever 3130 and associated mechanism.

If lever 3130 (FIG. 8) stands in a position other than the non-shift position shown, stud 3148, in moving into engagement with the V slot of lever 3130, will be moved upwardly to the left shift or right shift position. Stud 3148 is moved by reason of the camming action exerted on it by the V slot. Stud 3148 is carried by link 3149 which is also connected to member 3150. Member 3150 carries shelf 3076 (FIG. 6). The upward movement of stud 3148 moves link 3149 and the shelf 3076 on member 3150, and conditions the shift mechanism for a right or left shift.

Shelf 3076 (FIG. 6) underlies lever 1378 and by rocking downward causes lever 1378 to rock clockwise. During the reciprocation of ear 1386, notch 1390 is engaged thereby and effects the leftward movement of lever 1378, as described hereinbefore under the heading of "Carriage Shifting Mechanism."

Link 3149 (FIG. 9) has link connection 3565 with a lever 3566, which is urged by spring 3567 in a clockwise direction about a fixed pivot 3568. Thus, spring 3567 tends to rock the pin 3148 into the V slot 3569. The engagement of the pin and V slot are further insured by a booster mechanism which is driven by the setting clutch during the restore cycle. A cam (not shown but disclosed in the previously mentioned parent application) is operative to rock a lever fixed to shaft 3574 during each restore cycle. Lever 3575 (FIG. 9) is fixed to shaft 3574 and carries a roller 3576 on its upper end. During the restore cycle lever 3575 is rocked clockwise and roller 3576 is rocked into contact with lever 3577. Lever 3577 is thus rocked clockwise stressing a booster spring 3578 connected between levers 3577 and 3566. In this manner lever 3566 is under additional spring pressure to move clockwise and through link 3565, force pin 3148 into V slot 3569. The mechanism disclosed positively moves link 3149 upwardly to the right or left shift position, as the case may be.

Figure 11:
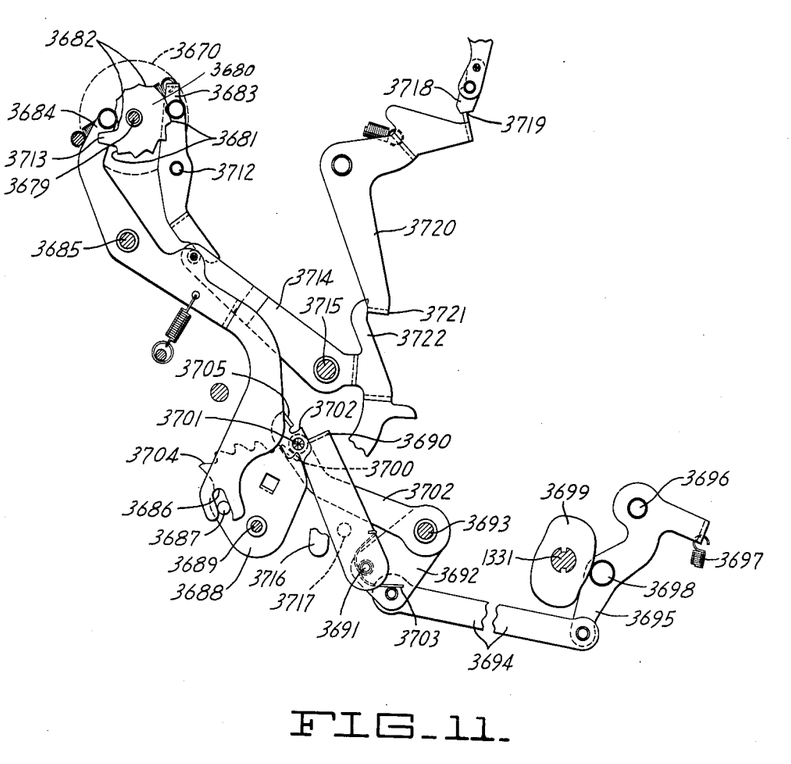
FIGS. 11 and 11A are right side views of the control mechanism for determining the number of ordinal shifts during a line-up operation.
Figure 11A:
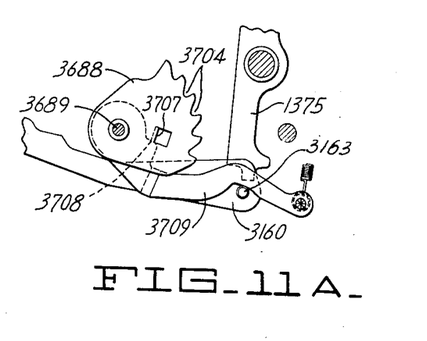
Figure 17:
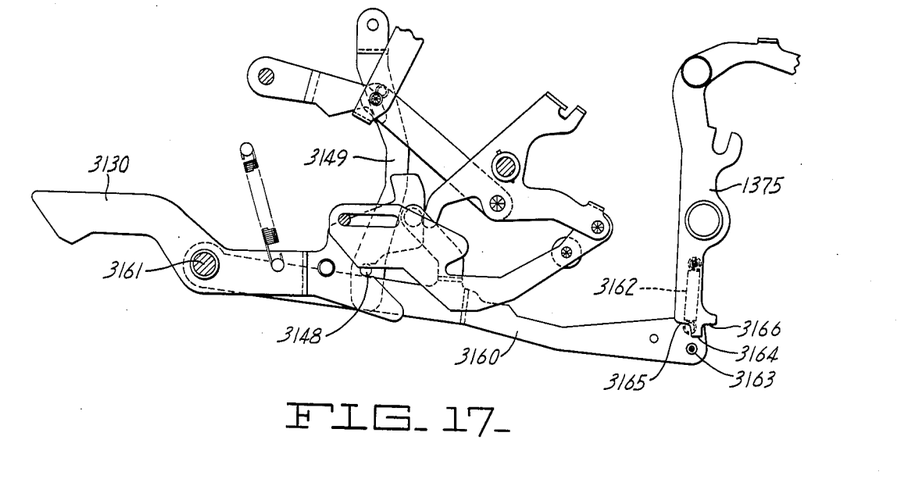
FIG. 17 is a right side view of a portion of the shift direction control mechanism.

When the carriage is raised during the latter part of the restore cycle, an automatic shift operation is initiated in the usual manner, and therefore a shift of the carriage is initiated. A carriage shift continues for so long as the lever 1375 is maintained in a rocked position by the stud 3163 on the shift latch lever 3160 (FIGS. 11A and 17). Stud 3163 engages either notch 3165 or notch 3166 on lever 1375, depending on the direction of shift initiated, as previously described.

A shift terminating mechanism described hereinafter comes into play as the carriage approaches home decimal position. This mechanism operates the shift latch lever 3160 and stops the machine with the carriage standing in a position determined by the depressed decimal key 3070.

DIVISION AND LINE-UP KEYS

Figure 10:
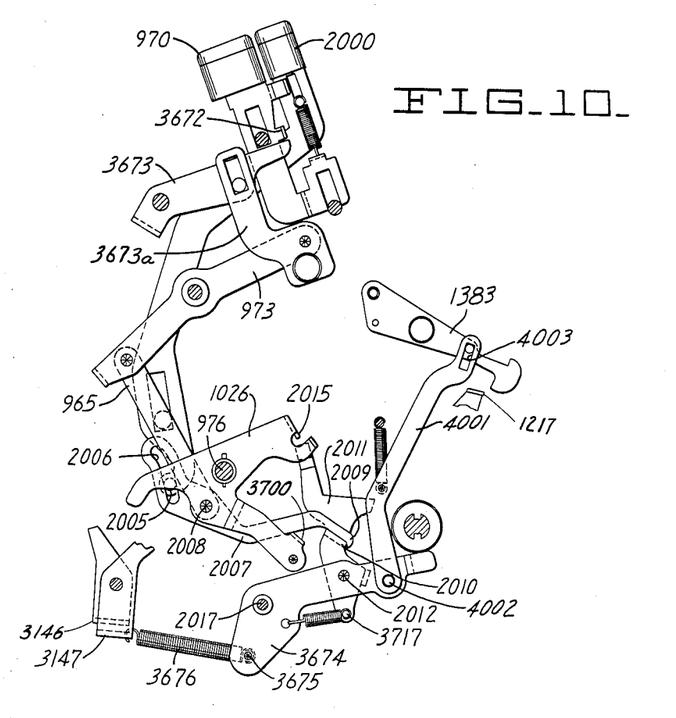
FIG. 10 a right side view of the divide and line-up keys and control mechanisms associated therewith.

Depression of the divide key 970 (FIG. 10) is effective through an ear 3672 thereon overlying a bail 3673 to depress the bail and through a link 3673a to rock a lever 973 clockwise. The latter has link connection 965 with a lever 1026 fixed to the shaft 976, the clockwise movement of which in response to depression of the divide key initiates the division operation as described in the previously mentioned Patent No. 2,271,240.

The line-up key 2000 is mounted for up and down sliding movement by means of pin and slot connections in the usual manner and is spring urged upwardly to the position shown by the means not shown. The extreme lowermost end of the line-up key carries a pin 2005 which resides within a slot 2006 in a lever 2007, pivotally mounted at 2008 upon the previously mentioned lever 1026. The rightmost end of lever 2007 is formed with a hook 2009 which overlies a shelf 2010 formed in an interponent 2011. The arrangement is such that the depression of the line-up key acts through the pin 2005 in the lowermost end thereof to rock the lever 2007 counterclockwise and thus remove the hook 2009 from the shelf 2010 of the interponent 2011. The latter therefore remains in the position shown and since the depression of the divide key causes lever 1026 to rock clockwise, ear 2015 on lever 1026 almost immediately contacts the upper end of interponent 2011. The latter is pivotally mounted at 2012 upon a shift initiating lever 3674 which is pivotally mounted at 2017 within the framework of the machine.

Lever 3674 carries a pin 3675 to which a spring 3676 is fixed. The opposite end of the spring is connected to a bail 3147 and within the spring resides a rigid pin, which forms a one-way solid connection between the arm 3674 and the bail 3147.

From the foregoing description it will be seen that upon clockwise movement of arm 3674 (FIG. 10) the one-way solid connection from said arm to bail 3147 causes the bail to rock clockwise and initiate the "blank cycle" followed by a shift operation. As these operations take place the contact of ear 2015 with interponent 2011 delays the initiation of the division operation until the shift operation is complete, as described in U.S. Patent No. 2,710,141.

Link 4001, pivotally mounted at 4002 to lever 3674, has pin and slot connection 4003 with the shift direction interponent 1383 and pulls the latter downward into engagement with ear 1217 to condition for a right shift during line-up operations. A right shift is therefore initiated by the clockwise movement of bail 3147 which shift is continuous until the carriage is shifted a predetermined number of orders indicated upon the line-up knob 3670 (FIG. 11).

The knob is mounted for rotation upon a fixed stud 3679 within the framework of the machine, and integral therewith is a cam 3680 having two sets of stepped cam surfaces 3681, 3682 for cooperation with a corresponding pair of followers 3683, 3684. The line-up knob is shown in its No. 5 position in which the rollers on the two cam followers lie on respective cam surfaces which are progressively spaced for moving the two levers away from the pivot point of the cam as the knob is rotated from its No. 5 to 0 position. Lever 3684 is pivotally mounted at 3685 and the lower end thereof has a slot 3686 which embraces a stud 3687 carried by a segment 3688 freely mounted upon the framework of the machine at 3689. Cooperating with the segment is a feed-back pawl 3690, freely mounted at 3691 upon a lever 3692. Lever 3692 is freely mounted at 3693 on the framework of the machine and has link connection 3694 with a cam follower 3695. The follower is pivoted at 3696 and a spring 3697 holds the follower in the clockwise position shown with the roller 3698 on the follower in contact with a cam 3699. The latter is keyed to shaft 1331 which is rotated 180° for each cycle of operation of the shift clutch. The feed-back pawl 3690 is urged counterclockwise by spring 3703 but is held in a clockwise position above the segment 3688 by a stop 3700. Upon depression of the divide and lineup keys, and consequent clockwise movement of lever 1026, FIG. 10, an ear 3700 (FIGS. 10 and 11) on the lower depending arm of the lever moves downwardly away from a pin 3701 carried by a hold lever 3702. The upper surface of the lever underlies the upper terminating ear on the feed-pawl 3690 and normally holds the pawl in the position shown. Upon clockwise movement of the lever 1026 (FIG. 10) the ear 3700 (FIG. 11) is moved away from the hold lever, and therefore the feed-pawl is permitted to rock counterclockwise in response to spring 3703 until it engages notches 3704 of the segment 3688.

This is the condition of the parts at the beginning of a shift operation, and as the shift clutch cam 3699 rotates, the follower 3695 acts through link 3694 to rock the lever 3692 in a counterclockwise direction thus pulling the feed-pawl 3690 toward the right, one increment for each cycle of operation of the shift clutch. This moves segment 3688 one notch in a clockwise direction whereupon the ear 3705 of hold-pawl 3702 engages successive teeth of the segment and holds it in successive positions. The shifting operation continues until the segment 3688 reaches its extreme clockwise or zero position, shown in FIG. 11A, at which time an ear 3707 formed on the segment, contacts a shoulder 3708 of a lever 3709 and rocks the lever clockwise about pivot 3689. The lever 3709 overlies the stud 3163 on the rightmost end of a shift latch 3160. As described in the previously mentioned patent application Serial No. 617,454, filed October 22, 1956, the clockwise movement of the latch 3160 is effective to terminate the shift operation.

As disclosed in the above-mentioned U.S. Patent No. 2,710,141, the interponent 2011 (FIG. 10) is rocked counterclockwise out from under the lever 1026 during the first shift cycle, thus tending to permit the lever 1026 to rock to a full clockwise position and initiate a division operation. However, other interlocks are provided as described in said patent, which are rendered effective immediately upon the operation of the shift clutch to delay the initiation of the division operations until the shift operation is terminated. The same interlocks are provided in the present machine, and therefore division operations are delayed until the shift operation is terminated as described above. At such time, the division operation is initiated and is carried to completion in the usual manner.

The previously mentioned follower 3683 (FIG. 11) is constantly urged in a counterclockwise direction about its pivot 3712 against the cam 3681 thus tending to centralize the line-up cam in any selected position thereof. When the knob stands in its zero position, however, a high point 3713 on the cam rocks the follower 3683 in a clockwise direction at which time the lowermost end of the follower contacts a stud on a lever 3714 and rocks the latter in a counterclockwise direction about its pivot 3715. The lower depending arm 3716 of lever 3714 lies adjacent a stud 3717 (FIGS. 10 and 11) on the interponent 2011, and therefore rocks the interponent counterclockwise out from under the ear 2015 on the lever 1026. Thus, when the line-up knob stands at "0," the line-up operation is disabled even though the line-up key should be depressed simultaneously with the divide key; therefore division operations will be initiated directly by the clockwise movement of the lever 1026.

It will also be observed that if carriage is standing in its rightmost position, and therefore incapable of partaking of a further rightward shift, means are provided for disabling the line-up mechanism even though the line-up key should be depressed. For this purpose, a lug 3718 (FIG. 11) depends from the carriage and cooperates with a camming surface 3719 on a lever 3720. An ear 3721 on the lower end of the lever contacts an upstanding arm 3722 of the previously described bellcrank 3714, the lower end of the lever contacts stud 3717 and moves the interponent 2011 to disabled position whenever the carriage stands in its rightmost position.

The invention claimed is:

1. In a calculating machine having a register comprising a plurality of ordinally arranged numeral wheels, actuators for the numeral wheels, means for shifting the register relative to the actuators, shift terminating mechanism, keys for initiating the operation of the shifting means, an operation control means for initiating sequential operation of the shifting means and the actuators, a member selectively settable to a plurality of numeral positions, means operable in timed relationship with the shifting means and under the control of said member for causing the operation of the shift terminating mechanism after a number of ordinal shifts corresponding in number to the numeral setting of said member.

2. In a calculating machine having a register comprising a plurality of ordinally arranged numeral wheels, actuators for the numeral wheels, means for shifting the register relative to the actuators, shift terminating mechanism, a plurality of keys for initiating the operation of the shift means and differentially operable to cause the operation of the terminating mechanism for causing a shift of the register to predetermined positions relative to the actuators, an operation control means for initiating sequential operation of the shifting means and the actuators, a member selectively settable to a plurality of positions, means operable in timed relationship with the shifting means and under the control of said member for causing the operation of the shift terminating mechanism after a selected number of ordinal shifts away from any one of said predetermined positions.

3. A calculating machine including a register carriage, the register comprising numeral wheels, actuators for the numeral wheels, cyclically operable means for shifting the numeral wheels relative to the actuators, a shift terminating mechanism, a member incrementally settable from an initial position to any one of a plurality of selective positions, normally enabled means for initiating the operation of the shift means, mechanism operable by the shift means for returning the member one increment for each cycle of operation of the shift means, and means responsive to a number of incremental movements of said member corresponding to said setting for causing the operation of the shift terminating mechanism.

4. A calculating machine according to claim 3 including means operable by the carriage when standing in an extreme end position, to disable the shift initiating means irrespective of the setting of said member in any one of said incrementally set positions.

References Cited in the file of this patent
UNITED STATES PATENTS

| | | |
|---|---|---|
| 1,409,575 | Rechnitzer | Mar. 14, 1922 |
| 2,291,133 | Avery | July 25, 1942 |
| 2,365,507 | Allen | Dec. 19, 1944 |
| 2,710,141 | Avery | June 7, 1955 |

OTHER REFERENCES

Eichler: Serial No. 288,057 (A.P.C.), May 25, 1943.